US006947578B2

(12) United States Patent
Lee

(10) Patent No.: US 6,947,578 B2
(45) Date of Patent: Sep. 20, 2005

(54) INTEGRATED IDENTIFICATION DATA CAPTURE SYSTEM

(76) Inventor: Seung Yop Lee, 9336 Twin Trails Dr., #203, San Diego, CA (US) 92129

( * ) Notice: Subject to any disclaimer, the term of this patent is extended or adjusted under 35 U.S.C. 154(b) by 812 days.

(21) Appl. No.: 09/832,810

(22) Filed: Apr. 12, 2001

(65) Prior Publication Data

US 2002/0149610 A1 Oct. 17, 2002

Related U.S. Application Data

(60) Provisional application No. 60/224,903, filed on Aug. 14, 2000.

(51) Int. Cl.[7] .............................................. G06K 9/00
(52) U.S. Cl. ...................... 382/116; 382/118; 382/119; 382/124; 340/5.81
(58) Field of Search ................................ 382/115–127; 356/71; 340/5.52, 5.53, 5.8–5.83; 902/3, 5

(56) References Cited

U.S. PATENT DOCUMENTS

| | | | |
|---|---|---|---|
| 3,683,764 A | | 8/1972 | Johnson |
| 4,213,684 A | | 7/1980 | Chamberlain |
| 4,264,166 A | * | 4/1981 | Morris ....................... 396/485 |
| 4,751,570 A | * | 6/1988 | Robinson ..................... 348/47 |
| 4,975,969 A | | 12/1990 | Tal |
| 5,012,522 A | | 4/1991 | Lambert |
| 5,049,987 A | | 9/1991 | Hoppenstein |
| 5,229,764 A | * | 7/1993 | Matchett et al. ........... 340/5.52 |
| 5,389,984 A | | 2/1995 | Lovenheim |
| 5,457,747 A | * | 10/1995 | Drexler et al. .............. 713/186 |
| 5,467,403 A | * | 11/1995 | Fishbine et al. ............ 382/116 |
| 5,659,625 A | | 8/1997 | Marquardt |
| 5,815,252 A | * | 9/1998 | Price-Francis ............... 356/71 |
| 5,850,352 A | | 12/1998 | Moezzi et al. |
| 5,850,852 A | | 12/1998 | Russell et al. |
| 5,859,920 A | | 1/1999 | Daly et al. |
| 5,859,921 A | | 1/1999 | Suzuki |
| 5,960,099 A | | 9/1999 | Hayes, Jr. et al. |
| 5,982,912 A | | 11/1999 | Fukui et al. |
| 6,038,012 A | | 3/2000 | Bley |
| 6,381,346 B1 | * | 4/2002 | Eraslan ....................... 382/118 |
| 6,421,453 B1 | * | 7/2002 | Kanevsky et al. .......... 382/115 |
| 6,526,161 B1 | * | 2/2003 | Yan ............................. 382/118 |
| 6,651,168 B1 | * | 11/2003 | Kao et al. ................... 713/185 |

OTHER PUBLICATIONS

"As Mugshots go Digital, FBI and Other Feds Start Looking into Protocols for Sharing Data" Law Enforcement Technology, Dec. 15, 1995, p. 1.

K. Richert, "Electronic Mugshot Imaging", Law Enforcement Technology, Jun. 1992, pp. 20, 21, 38 & 39.

NBS IDS 2100 Advertisement, May 1995.

* cited by examiner

Primary Examiner—Jon Chang
Assistant Examiner—Charles Kim
(74) Attorney, Agent, or Firm—Rosenberg, Klein & Lee

(57) ABSTRACT

A system (10) for capturing identification data pertaining to a subject is provided. The system (10) generally comprises a main support assembly (200) spaced a predetermined distance from the subject; a plurality of image capture devices (300a–300c) displaceably supported by the main support assembly (200); at least one auxiliary data capture device (400a–400d); and, a programmably configured workstation (100) operably coupled to each of the devices (300a–300b, 400a–400b) for automatically controlling those devices responsive to user actuation thereof. Image capture devices (300a–300b) operate to concurrently generate a plurality of graphic representations of the subject. They are adjustably disposed for respectively rendering the graphic representations from preselected view orientations. At least one auxiliary data capture device (400a–400d) is operable to capture a predetermined biometric parameter pertaining to the subject.

20 Claims, 10 Drawing Sheets

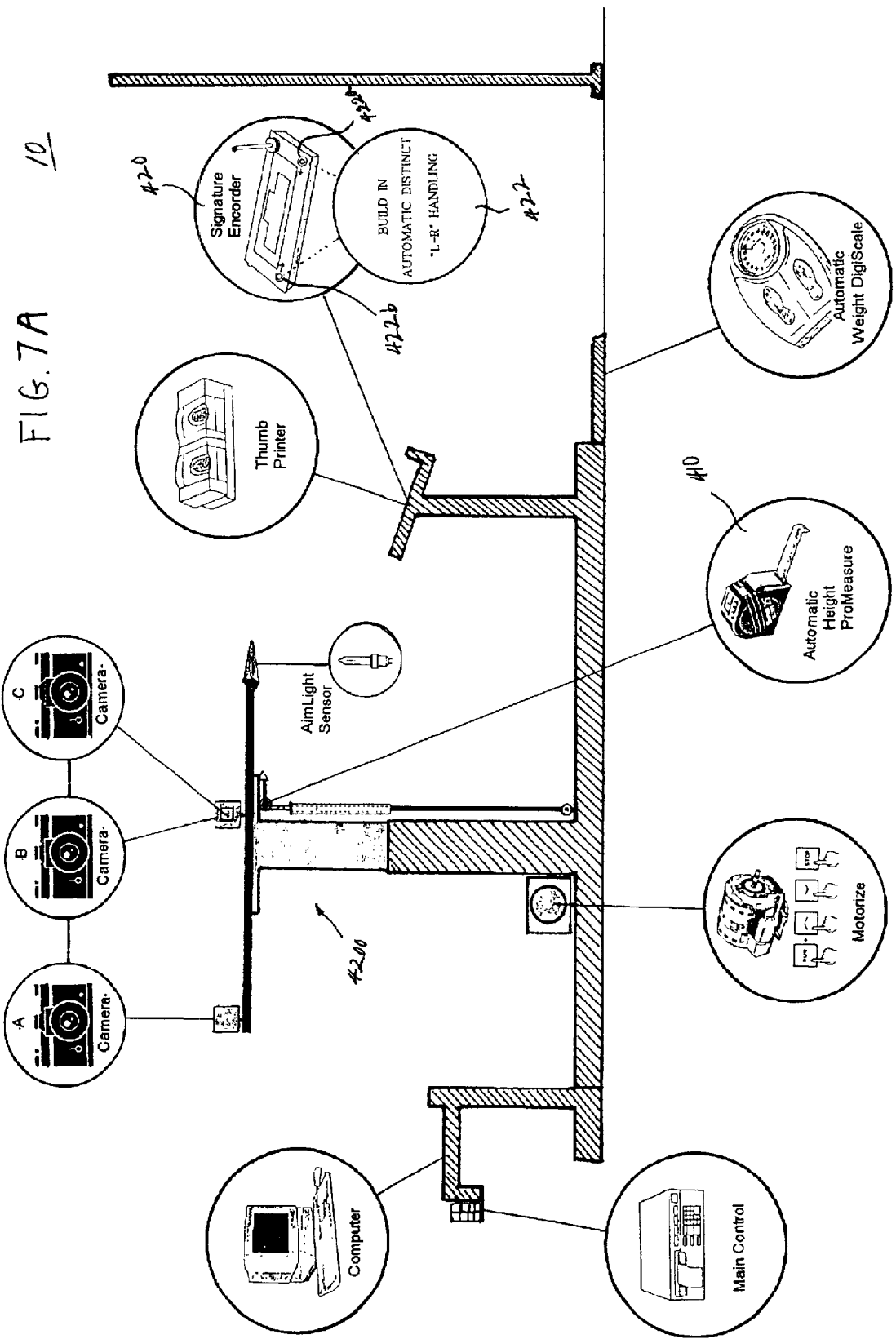

INTEGRATED IDENTIFICATION DATA CAPTURE SYSTEM

RELATED PATENT INFORMATION

This Patent Application is based upon U.S. Provisional Patent Application, Ser. No. 60/224,903, filed Aug. 14, 2000.

BACKGROUND OF THE INVENTION

Field of the Invention

The subject integrated identification data capture system is generally directed to a system for acquiring and storing different aspects of a subject's identifying data. More specifically, the integrated identification data capture system provides the measures necessary for a user to concurrently acquire in a simple yet reliable manner a predetermined set of a subject's identifying data.

Efforts to comprehensively and reliably acquire data so as to uniquely identify each of a great number of subjects present considerable obstacles. This is particularly so where human subjects are to be uniquely identified, and the identifying data is to be quickly and unobtrusively captured. Such challenges are readily apparent, for example, in the case of Law Enforcement Agencies and their initial processing of subjects arrested for suspected unlawful conduct.

Once a subject—or suspect, in that context—is apprehended, he or she is typically transported to the local stationhouse, or detention center, then processed for detention to await a judicial hearing. Typically as one of the first steps in this initial processing, numerous views of the suspect from the shoulder up are successively photographed to obtain a set of so-called 'mug shots' of that suspect. Before each photograph, the suspect is positioned in turn to either face the photographing camera, to turn and face a first lateral direction, to turn and face a second lateral direction, or to assume other such orientations relative to the camera. Also before each photograph is taken, various components of the photographic equipment, such as a flash device are permitted sufficient time to reset or recycle in preparation for the next photograph. The Law Enforcement Officer or other user personnel carrying out the photographing process must take great care so as not to disturb between successive photographs settings and adjustments like camera alignment, relative distances between components, and background lighting.

Also as part of the initial processing, the suspect is manually fingerprinted—usually at an area or station separate and apart from the photographing area/station. The fingerprints are obtained on a pre-printed card or form on which the suspect's vital information is also recorded. This vital information may include the suspect's height, weight, and blood type, for example, and may be separately acquired at one or more different areas/stations.

The various parts of such initial processing may, of course, be accurately and reliably effected by Law Enforcement Agencies, given ample time and staffing to carry out each step in the processing carefully and deliberately. Like many public agencies, however, Law Enforcement Agencies—particularly those at the local level in densely populated urban areas—are notoriously lacking in resources, particularly in terms of the time afforded to the processing of any one suspect and the number of qualified personnel available to staff the various processing areas/stations.

Local police precincts and short term detention centers where the vast majority of suspects' initial processing typically occur very often house a bustle of activity as offenders are apprehended and 'booked' for various offenses. Consequently, there often remains a persistent backlog of suspects awaiting processing amidst the near chaotic swirl of ongoing activity. Attempts to properly process a subject at each of the processing stations are invariably impeded by the pressure to carry out the given processing steps as quickly as possible so as to process the next subject in waiting. They are further impeded in no small measure by the lack of staff members to separately oversee each distinct part of the overall initial processing. The situation is in many cases exacerbated by the unruliness of one or more subjects, and by the inherent disincentive of suspects, generally, to remain cooperative through each of the various processing steps.

What typically results, then, is a collection of acquired identifying data for numerous subjects marked by inconsistency in the quality of the data captured and, not surprisingly, incompleteness in the identifying profile provided thereby. In the rush to acquire the successive mug shot photographs, for instance, a user may fail to wait the time necessary to permit full recycling of the camera's flash, such that a dimmer, inadequately-exposed photograph is thereafter acquired. Also, without the time or opportunity to directly measure certain biometric parameters of the given subject at a separate station, the user may resort to simply transcribing possibly outdated or erroneous values for those parameters from the subject's driver's license or other such more conveniently available sources. The user may, alternatively, altogether forego entering any such biometric parameter values.

Even where the user(s) takes the time and care to accurately acquire and record the various identification data, much if not all of the data is still captured and recorded manually in hard-printed form. That is, the acquired mug shot photographs are either printed or affixed onto a standard form or card. The other identifying data, including inked fingerprints, are likewise recorded directly onto that same form or card to obtain a hard-printed 'paper' original of the identifying data record. This 'paper record' is maintained in a given agency's paper files for later manual access.

It often becomes necessary, especially in Law Enforcement applications, for the vital information contained in such records to be shared amongst remotely disposed offices and/or jurisdictions. The paper record form which currently predominates in the cataloguing of previously-arrested subjects' identifying data hardly facilitates the free exchange of information between offices/jurisdictions seeking to pool together their resources, or to cooperate with one another in their enforcement activities. Extensive manual intervention becomes necessary to effect the exchange of pertinent suspect identification data—the transmission from one site to another typically occurring heretofore via verbal conveyance, facsimile transmission, electronic delivery of scanned (or otherwise digitized) paper records, and the like. The degradation in quality and potential for error inherent to such means of exchanging data—not to mention the cumbersome nature and inconvenience of the required manual intervention—remain significant obstacles to efficient Law Enforcement and, therefore, to greater public safety.

There is, therefore, a need for a system and method of reliably capturing a subject's identification data in quick and convenient manner. There is also a need to thus acquire and store such identification data in a form which readily facilitates the exchange thereof between remotely disposed sites.

PRIOR ART

'Mug shot' photographing systems are known in the art, as are various measurement devices for electronically acquiring such biometric parameters as weight, height, thumb/fingerprint, and writing sample. Systems are also known in the art for capturing more than one imaged view of a subject or scene in order to generate a three-dimensional image or a video mosaic of the given subject/scene. The best prior art known to Applicant includes U.S. Pat. Nos. 5,850, 352; 5,049,987; 5,389,984; 3,683,764; 4,213,684; 4,245, 902; 5,982,912; 5,859,920; 5,659,625; 6,038,012; 4,975, 969; 5,960,099; and, 5,002,522. Such known systems, however, do not disclose measures for capturing a plurality of identification data types. Nor do they disclose in an integrated system measures for capturing in substantially concurrent manner a plurality of graphic representations of a subject from preselected view orientations combined with auxiliary measures for capturing a predetermined biometric parameter for subject identification purposes.

For instance, U.S. Pat. No. 5,850,852 is directed to a system wherein more than one video camera is trained upon a scene so as to provide multiple video perspectives thereof. The multiple video perspectives are processed together in computerized manner to form panoramic, stereoscopic, or other 'hypermosaic' images of the scene. While the system may be employed in numerous applications, the Patent nowhere discloses the incorporation of other measures, such as any auxiliary measures for capturing one or more predetermined biometric parameters pertaining to a subject within the given scene to effect the efficient and convenient capture of identification data pertaining to that subject. Indeed, the system embodiments disclosed are intended primarily to formulate a thorough video record of the various movements and motions occurring within the given scene, not to acquire a comprehensive set of data elements for accurately identifying a particular subject.

Similarly, U.S. Pat. No. 5,049,987 is directed to a system for creating multi-dimensional images of a subject. The system employs a plurality of image capture devices arranged in a predetermined pattern about a target, so as to generate a plurality of separate and equally sized strip images which are thereafter combined to compositely form a three-dimensional or other multi-dimensional television image. Again, this Patent nowhere discloses the incorporation of other measures to obtain a comprehensive set of data elements by which a particular subject may be accurately identified.

SUMMARY OF THE INVENTION

It is a primary object of the present invention to provide a system for quickly and conveniently acquiring various aspects of identification data pertaining to a subject.

It is another object of the present invention to provide a system for capturing in substantially concurrent manner a plurality of images of a given subject in acquiring a predetermined set of identification data.

These and other objects are attained in accordance with the present invention by the subject identification data capture system for capturing identification data pertaining to a subject. The system generally comprises: a main support assembly spaced a predetermined distance from the subject; a plurality of image capture devices displaceably supported by the main support assembly; at least one auxiliary data capture device; and, a programmably configured workstation operably coupled to the image capture and auxiliary data capture devices for automatically controlling the devices responsive to user actuation thereof. The image capture devices operate to concurrently generate a plurality of graphic representations of the subject, and are adjustably disposed for respectively rendering the graphic representations from preselected view orientations. The auxiliary data capture device operates to capture at least one predetermined biometric parameter pertaining to the subject. In one preferred embodiment, the subject system includes at least one auxiliary data capture device selected from the group consisting of: a weight sensor, a height sensor, a fingerprint digitizer, a handwriting sample capturing electronic writing pad, and a document scanner. Also in a preferred embodiment, the subject system further comprises a lighting assembly operably coupled to the workstation actuable in synchronized manner with the image capture devices. Preferably, the system includes at least three image capture devices, each having a photo-capture portion. The image capture devices in that embodiment are disposed in spaced manner one relative to the others to respectively render a front and a pair of opposing side views of the subject. Preferably, each photo-capture portion includes a digital camera operable to generate a graphic representation of the subject in electronic form.

BRIEF DESCRIPTION OF THE DRAWINGS

FIG. 7A is a schematic view illustrating the system's layout in an exemplary application of yet another alternate embodiment of the present invention, with certain system components symbolically depicted;

DETAILED DESCRIPTION OF THE PREFERRED EMBODIMENTS

Figure 1:
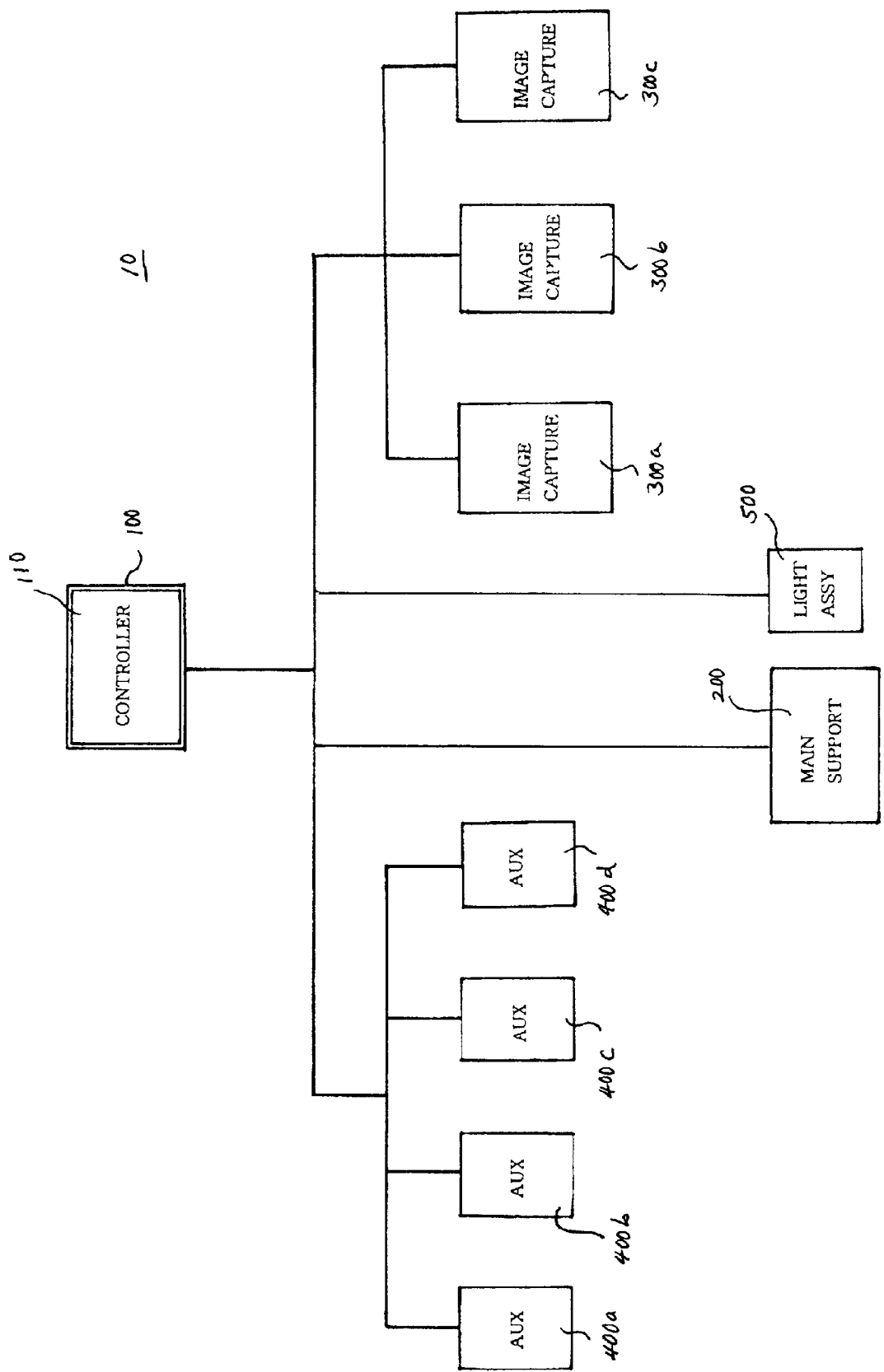
FIG. 1 is a schematic block diagram illustrating an intercoupling of component devices in an exemplary embodiment of the present invention.

Referring now to FIG. 1, there is shown a block diagram illustrating the functional interconnection of components in one embodiment of the subject integrated identification data capture system 10. System 10 includes a work-station 100 preferably having a microprocessor-based controller 110 for automatically actuating in accordance with executable software programmably implemented therein various devices to which it is coupled. System 10 further includes a main support assembly 200, a plurality of image capturing devices 300a, 300b, 300c, a plurality of auxiliary data capture devices 400a, 400b, 400c, 400d, and a light assembly 500 all preferably coupled for actuation and/or control via workstation 100.

Supported by main support assembly 200, selected ones of the image capture devices 300a–300c are actuated in coordinated manner to generate photographs or other graphic representations imaging multiple views of the subject. Preferably, image capture devices 300a–300c are controlled to capture the graphic representations in substantially concurrent manner. Light assembly 500 is controlled in suitably synchronized manner with image capture devices 300a–300c such that it provides substantially uniform, preferably common, illumination of the subject during image capture by devices 300a–300c.

The graphic representations generated by image capture devices 300a–300c are passed, preferably in electronic form, to controller 110 for suitable processing, formatting, and subsequent storage at workstation 100. The graphic representations may then be displayed along with other identification data pertaining to the subject at workstation 100. They may also be printed with the other identification data to form a hard copy version of the resulting record. An electronic version of the record may also be readily delivered electronically to other remote sites via suitable computer network means for reproduction at those sites seeking access to such identification information.

Auxiliary data capture device 400a, 400b, 400c, 400d are included in system 10 for capturing distinct biometric and, perhaps, other parameters pertaining to the subject. Such biometric parameters may include, for example, the subject's weight, height, finger/thumb prints, handwriting, and the like. One or more of the auxiliary capture devices 400a–400d may also capture parameters pertaining to the subject more indirectly—for instance, by scanning existing documents. Preferably, at least one auxiliary data capture device 400a–400d senses or measures a given biometric parameter and transduces the captured data to electronic form for incorporation into the given subject's identification record by controller 110.

Figure 2:
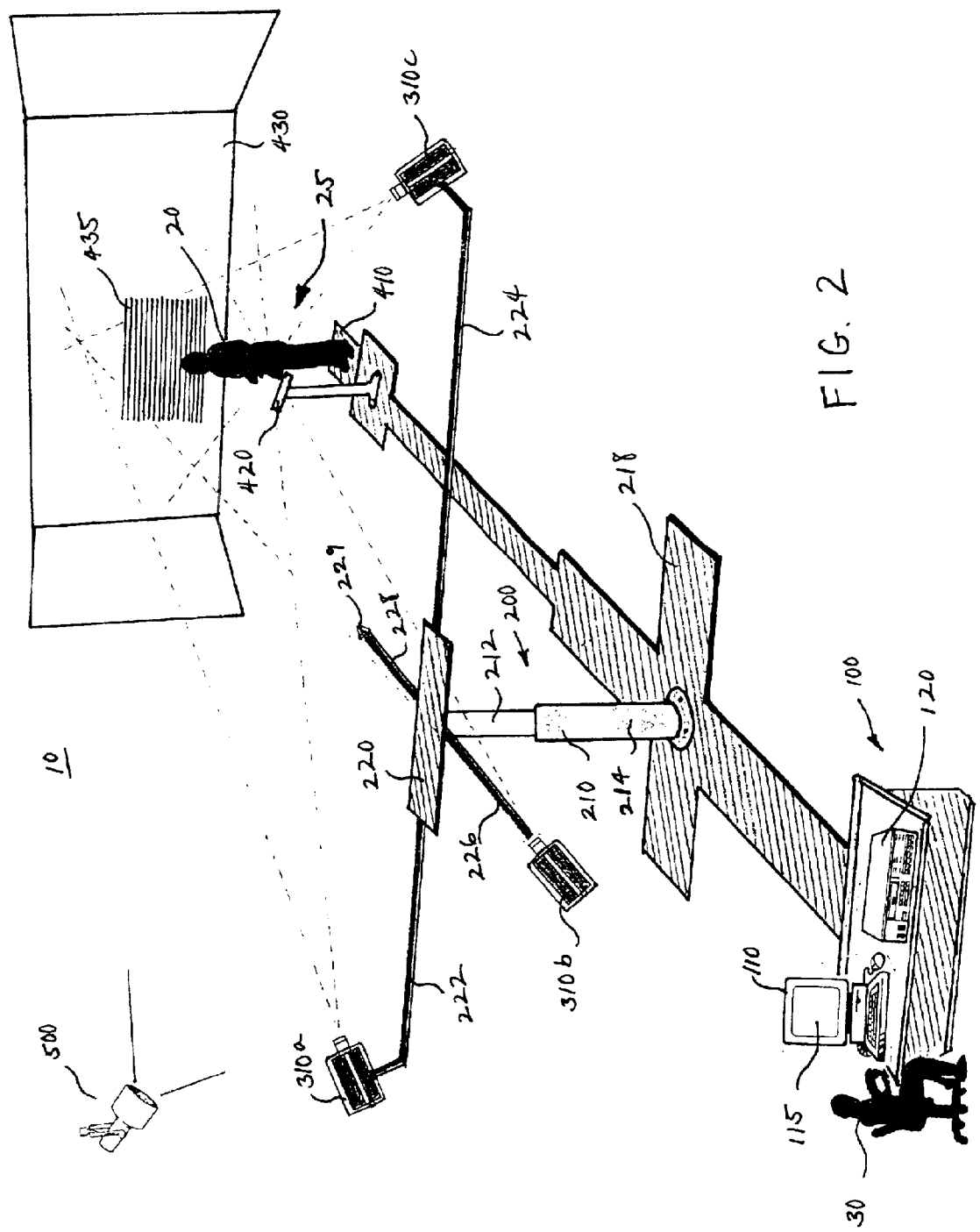
FIG. 2 is a schematic perspective view illustrating an exemplary layout of component devices in an exemplary application of one embodiment of the present invention.

Turning now to FIG. 2, there is shown one embodiment of system 10 configured for an exemplary application. System 10 is employed as shown in this embodiment to capture identification data pertaining to a subject 20 responsive to actuating controls effected at workstation 100 by a user 30. Controller 110 is provided at workstation 100 in the form of a computer having a graphic display and a control panel 120 coupled thereto. Control panel 120 preferably provides for the user a keyboard, a pointing device joystick, mouse, trackball, . . . ), and/or other such user interface equipment by which user 30 may enter various controlling commands.

Preferably, a main support assembly 200 is electrically coupled to workstation 100. Support assembly 200 in this embodiment includes a stand 210 having a base member 214 to which an extension member 212 is telescopically coupled. In certain embodiments, base member 214 may be displaceably supported by a plurality of casters (not shown) which facilitate its displacement relative to an underlying track or platform 218. Preferably, electromechanical measures of any suitable type known in the art are employed either within base member 214, platform 218, or in the interface therebetween to provide automated displacement of stand 210 with respect to platform 218 (and, therefore, subject 20) responsive to controlling inputs at workstation 100. Such suitable electromechanical means are also preferably employed to adjustably displace in similar manner a plurality of support arms coupled to extension member 212 (described in following paragraphs).

Alternatively, support assembly 200 may be provided without any platform 218. Also, support assembly 20 may be provided with stand 210 simply disposed for manual displacement relative to subject 20. A user may then directly manipulate stand 210 as needed prior to system operation.

A plurality of support arms 222, 224, 226, 228 are coupled to extend transversely from extension member 212 via a support bracket 220. Each support arm 222–228 engages bracket 220 in such manner that it may be displaced relative to bracket 220 either independently, or in concert with at least one other support arm 222–228, depending on the range of adjustability desired for the intended application. Each support arm 222–228, as well as bracket 220 and the supporting stand structure 210 may be formed of steel, wood, composite, or any other suitable material known in the art of comparable strength and rigidity to provide sufficiently stable and secure support for at least the image capture devices 300a–300c employed in the given application. Support arms 222–228 and other structural members forming main support assembly 200 may be formed with any suitable contour and structural configuration other than that shown, so long as image capture devices 300a–300c are supported at their relative positions and orientations in a manner suitable for the intended application.

Coupled at preselected points on respective support arms 222, 226, 224 are at least photo-capture portions 310a, 310b, 310c of image capture devices 300a, 300b, 300c. Each photo-capture portion 310a–310c preferably includes a digital camera of a suitable type known in the art actuable to generate a graphic representation of subject 20 (from a particular aspect angle) for electronic storage as a digital image file. Such image capture devices 310a, 310b, 310c are positioned and oriented by their respective support arms 222, 226, 224 to provide views of subject 20 from various mutually offset angles. Though they may be independently actuated one after the other, coordinated actuation of devices 310a–310c via workstation 100 enables user 30 to acquire in substantially concurrent manner multiple 'photographic' views of subject 20 that together form, for instance, a set of 'mug shots' without requiring subject 20 to be re-positioned between shots.

Preferably, an aim light 229 is provided at a terminal end of support arm 228. Aim light 229 may be a laser diode or any other source of sufficiently coherent light that would project upon subject 20 (or some other predefined reference point) to provide user 30 with a visual indication of at least one image capture device's pointing direction. This enables user 30 to accurately set that pointing direction. Preferably, the printing directions of the remaining image capture devices are fixed relative to an adjustable pointing direction. A user may thereby set the pointing directions of all image capture devices by setting the adjustable one.

The given subject 20 is positioned for processing by system 10 at a subject station 25. System 10 provides at subject station 25 one or more auxiliary data capture devices for acquiring various biometric parameters of subject 20 to supplement the image data captured by devices 310a–310c. Preferably, system 10 includes a plurality of such auxiliary data capture devices, including a weight sensing device 410, thumb/finger print and handwriting sample sensing tablet device 420, and a background assembly 430. Background assembly 430 provides visual or optical markers 435 against which to derive the height of subject 20.

Weight sensor 410 on which subject 20 stands during processing may be of any suitable type known in the art. Preferably, though, weight sensor 410 is realized in the form of an electronic device which generates a measure of the subject's weight in digital electronic form, making it available for transmission directly to controller 110 of workstation 100. Such transmission of the weight measurement may be transmitted via a hard-wired coupling routed through platform 218 or, alternatively, through any suitable wireless transmission means known in the art.

Digital tablet device 420 is provided adjacent weight sensor 410 raised by a pedestal or some other structure to the height necessary to be within the convenient reach of subject 20 (when standing upon weight sensor 410). Device 420 may also be of any type known in the art suitable for capturing the thumb/finger print and handwriting or signature sample of subject 20. Device 420 may actually include separate tablets or electronic pads for each function, if desired or necessary for the intended application. While standing at subject station 25, subject 20 is prompted to touch device 420 with the appropriate thumb or finger and to sign or write a particular word(s) with a pen-like device provided at device 420. Employing optical, thermal, or any other suitable digitizing tablet technology known in the art, device 420 generates and transmits to controller 110 a digital form of each captured print or handwriting sample.

Background assembly 430 is situated behind weight sensor 420 such that portions of its markers 435 are visually obstructed from the perspective of at least one image capture device 310a–310c, for instance. Markers 435 may be passive, simply serving as background indicia against which user 30 may visually compare the foreground image of subject 20 while viewing one or more of the graphic representations captured by devices 310a–310c. User 30 may thus manually determine the subject's height for entry at workstation 100. In a different embodiment, the subject's height measurement may be automatically determined by suitable optical processing software executed by controller 110 upon the appropriate graphic representation. Alternatively, markers 435 may contain a bank of active optical devices having corresponding receiver or transmitter devices positioned on one or more other portions of system 10 whereby the subject's height is determined based upon the subject's partial blockage of the optical beams passing between the optical devices.

System 10 preferably further includes a lighting assembly 500 operably coupled to workstation 100 for synchronized actuation with image capture devices 310a–310c. Lighting assembly 500 preferably includes flash equipment for illuminating subject station 25 during the operation of image capture devices 310a–310c in order to insure optimum and uniform lighting conditions for each image captured. As image capture devices 310a–310c are preferably actuated in substantially concurrent manner to simultaneously capture multiple views of subject 20, a single flash or illumination cycle of lighting system 500 may be efficiently shared for the capture of such multiple views. The inconsistency in lighting conditions and the resulting disuniformity of exposures often plaguing the separate capture of images is thus avoided. Furthermore, the lack of precise correspondence between separately acquired views of subject 20—resulting, for instance, from disuniform lighting conditions, as well as from the subject's change in facial expression and posture between successively acquired views—may be similarly avoided.

The electrical coupling between workstation 100 and the various devices of system 10 are not specifically shown. Such coupling may be realized via hard-wired connections that may be routed between the respective devices and workstation 100 in any suitably inobtrusive and inconspicuous manner. As mentioned, they may be routed along or through portions of main support assembly 200 and/or platform 218, as appropriate. Alternatively, the devices may be coupled to workstation 100 via any suitable wireless link known in the art. For example, components of lighting assembly 500 and each of the image capture devices 310a–310c may be coupled to workstation 100 via infrared, RF, or other suitable wireless transceiving means available for the given application.

Figures 3, 3A, 3B:
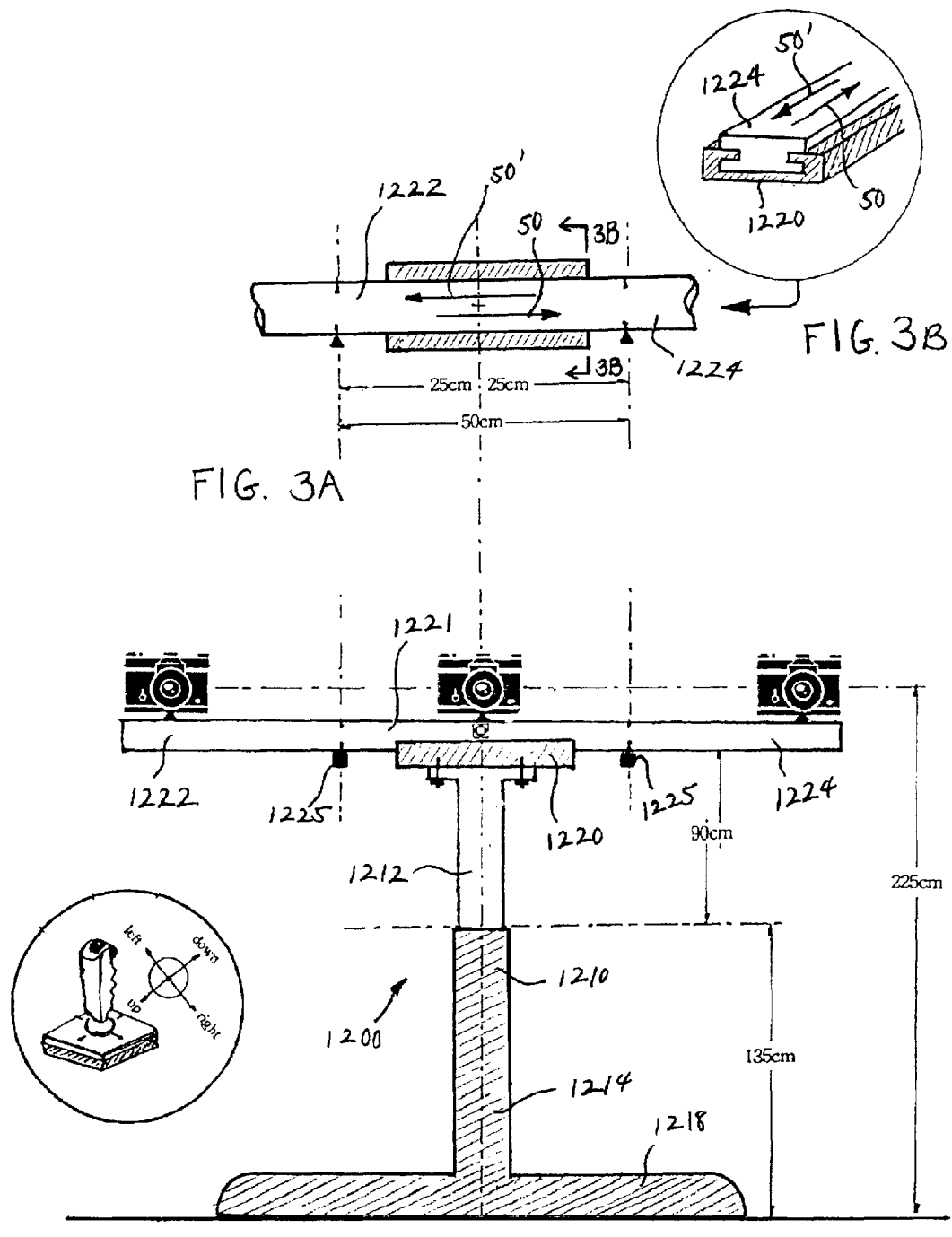
FIG. 3 is a schematic elevational view of a portion of one embodiment of the present invention.
FIG. 3A is an illustrative plan view, partially cut-away, of a part of the system portion shown in FIG. 3.
FIG. 3B is a partial sectional view of the system part shown in FIG. 3A.

Turning next to FIGS. 3, 3A, and 3B, there is illustrated an alternate embodiment of main support assembly 1200. In this embodiment, the support assembly's stand 1210 includes a base portion 1214 which telescopically receives an extension portion 1212 fixedly coupled to platform 218. Support arms 1222 and 1224 form distal portions of a common arm structure 1221 which slidably engages a support bracket 1220 as shown in FIG. 3B. The portions 1222 and 1224 of arm structure 1221 have respectively coupled thereto motor-powered drive members 1225 for automatic displacement of arm structure 1221 (relative to support bracket 1220) along the directions indicated by arrows 50, 50'. As mentioned in preceding paragraphs, such motor-powered drive of the arm structure's displacement is preferably controlled by user 30 via workstation 100.

Also shown in FIGS. 3 and 3A are one set of exemplary dimensions for various portions of main support assembly 1200. These dimensions indicate the permissible range of displacement of various structural portions relative to other portions in the exemplary application of the embodiment shown. It is to be understood, however, that such dimensions are shown for illustrative purposes only, and the present invention is not limited thereto.

Figure 4:
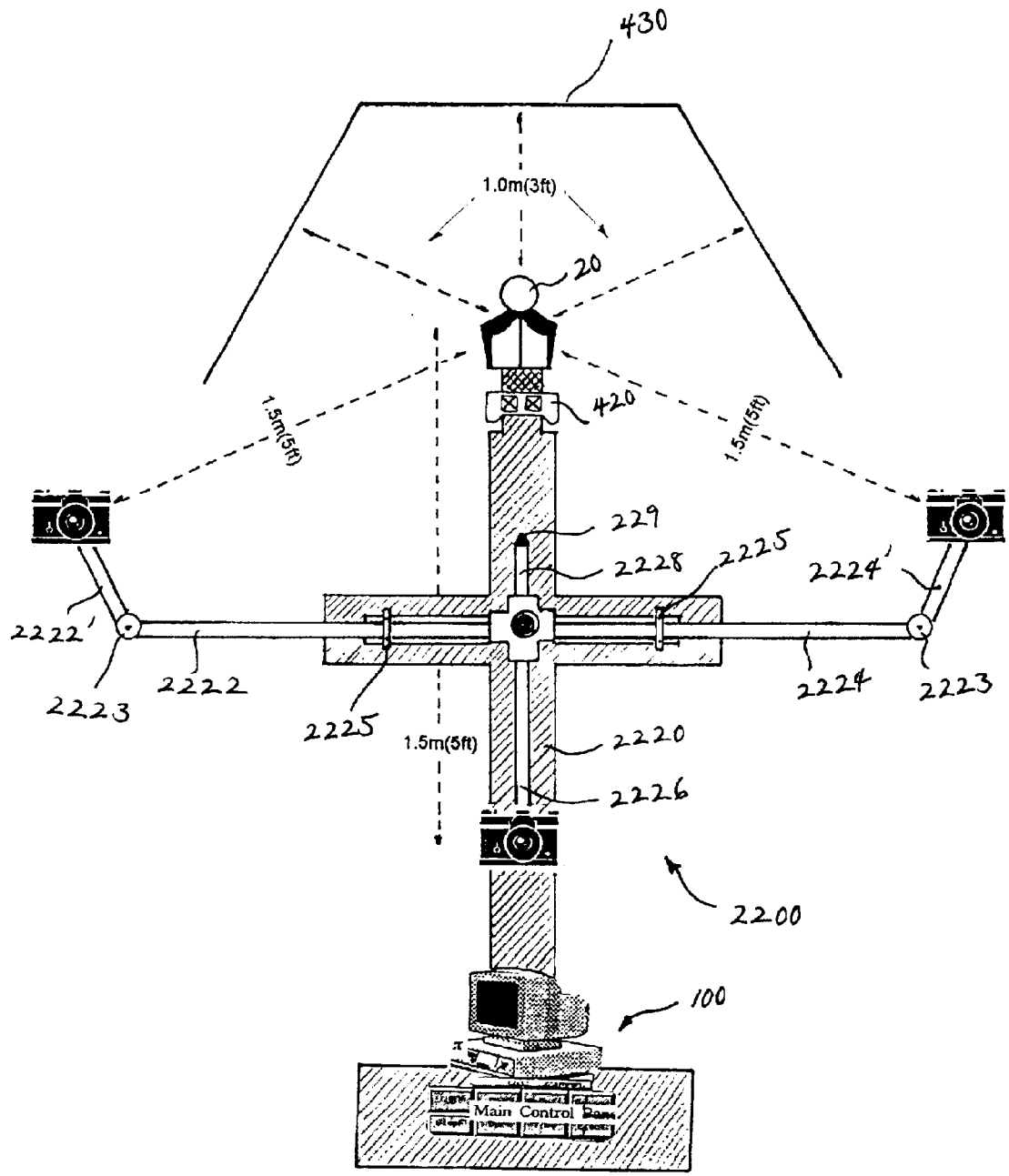
FIG. 4 is a schematic view illustrating the system's layout in an exemplary application of one alternate embodiment of the present invention.

Referring to FIG. 4, there is illustrated yet another embodiment of main support assembly 2200 employed in an exemplary application in accordance with the present invention. In this embodiment, each of the support arms 2222 and 2224 includes terminal portions 2222', 2224' coupled respectively thereto in pivotally adjustable manner by elbow portions 2223. Support arms 2222, 2224 are along with support arms 2226, 2228 displaceably supported by support bracket 2220. Each of the support arms 2222, 2224, 2226, 2228 is formed with a tubular or cylindrical contour to readily permit an additional range of displacement rotatively about its axial extent. Also in this embodiment, motor-driven displacement drive mechanisms 2225 are provided at least for support arms 2222 and 2224 to automatically effect their displacement relative to support bracket 2220 responsive to appropriate actuation via workstation 100. Again, exemplary relative dimensions of various system portions relative to other system portions are shown merely for illustrative purposes.

Figure 5:
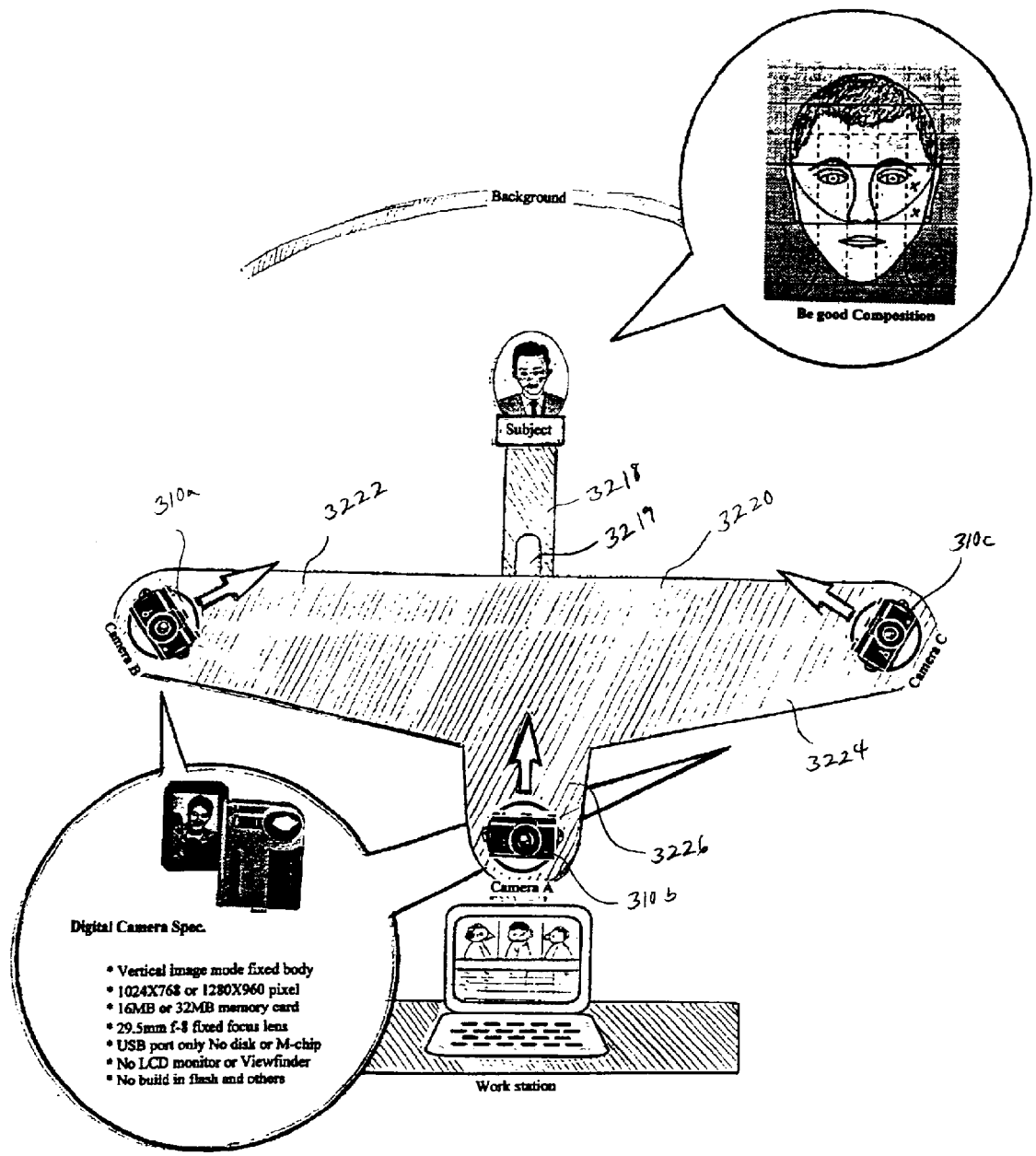
FIG. 5 is a schematic view illustrating the system's layout in an exemplary application of another alternate embodiment of the present invention.

FIG. 5 illustrates still another alternate embodiment wherein support arms 3222, 3224, 3226 are integrally formed as laterally extended portions of support bracket 3220. Support bracket 3220 is coupled to and elevated by a stand structure 210 (hidden from view) which is slidably coupled to a slotted track 3219 formed in the underlying platform 3218.

Also shown in FIG. 5 is an exemplary type of digital camera employed in each image capture device 310a, 310b, 310c. Such digital camera may, for example, include among its specifications: a vertical image mode, pixel resolution on the order of 1024×768 to 1280×960; memory capacity ranging between 16 MB–32 MB; a 29.5 mm f-8 fixed focus lens; and, a USB port.

Where circumstances permit, system costs may be reduced by omitting from each digital camera's features those rendered redundant or not essential for system operation in accordance with the present invention. For instance, separate disk or memory chip provisions normally included in commercially available digital camera devices may be omitted. Similarly, a separate LCD monitor or viewfinder typically provided on such commercially available digital cameras may also be omitted, as a display monitor remains available at workstation 100 for a user to view an image captured by a given system camera. Additionally, flash devices also provided on commercially available digital cameras may likewise be omitted where the system employs lighting assembly 500.

Figure 6:
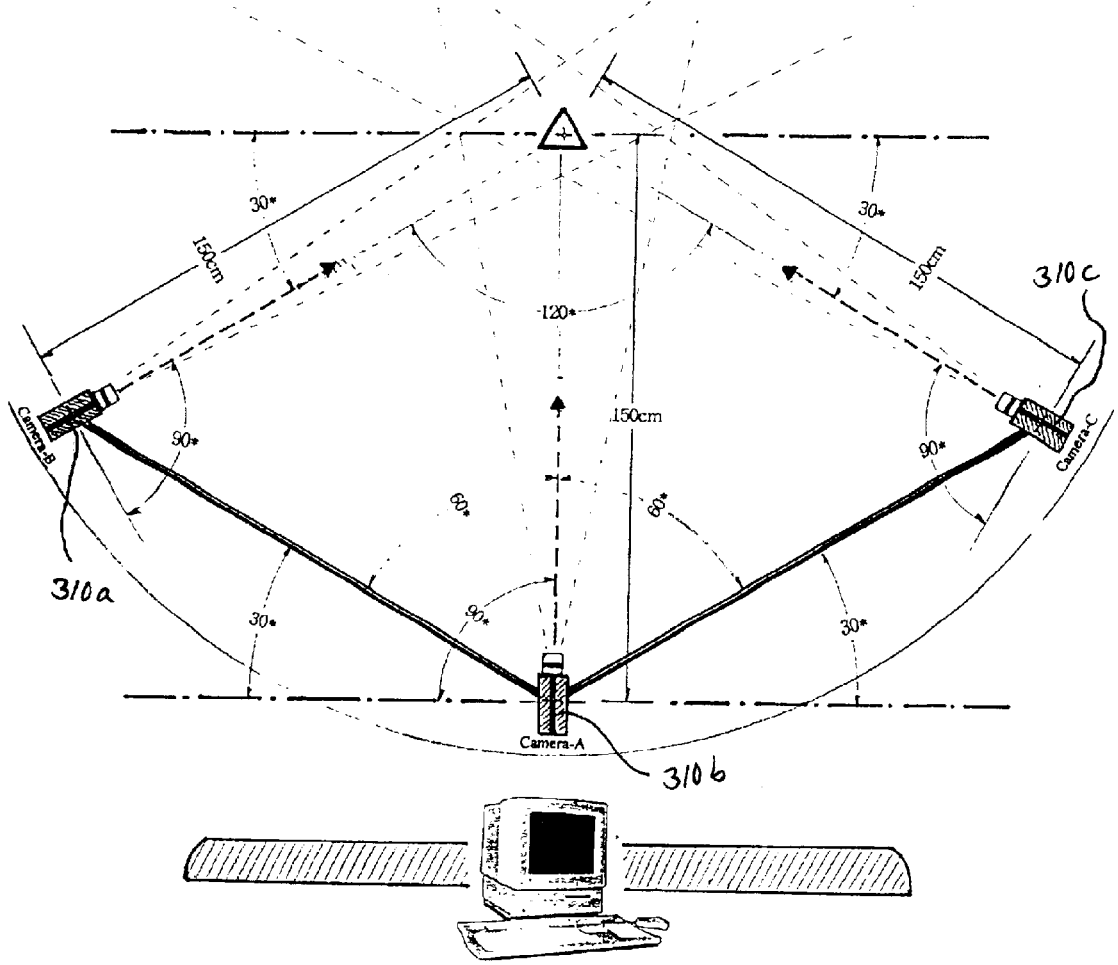
FIG. 6 is a schematic diagram illustrating the relative view orientations that may be employed for component devices in an exemplary application of the present invention.

Turning next to FIG. 6, there is illustrated the geometric positioning relationships and orientations of the image capture devices 310a, 310b, 310c employed in the embodiment shown in FIG. 5. The relative angles and dimensions shown, again, merely illustrate an exemplary application of the disclosed embodiment; and, the present invention is not in any way limited thereto.

Figure 7:
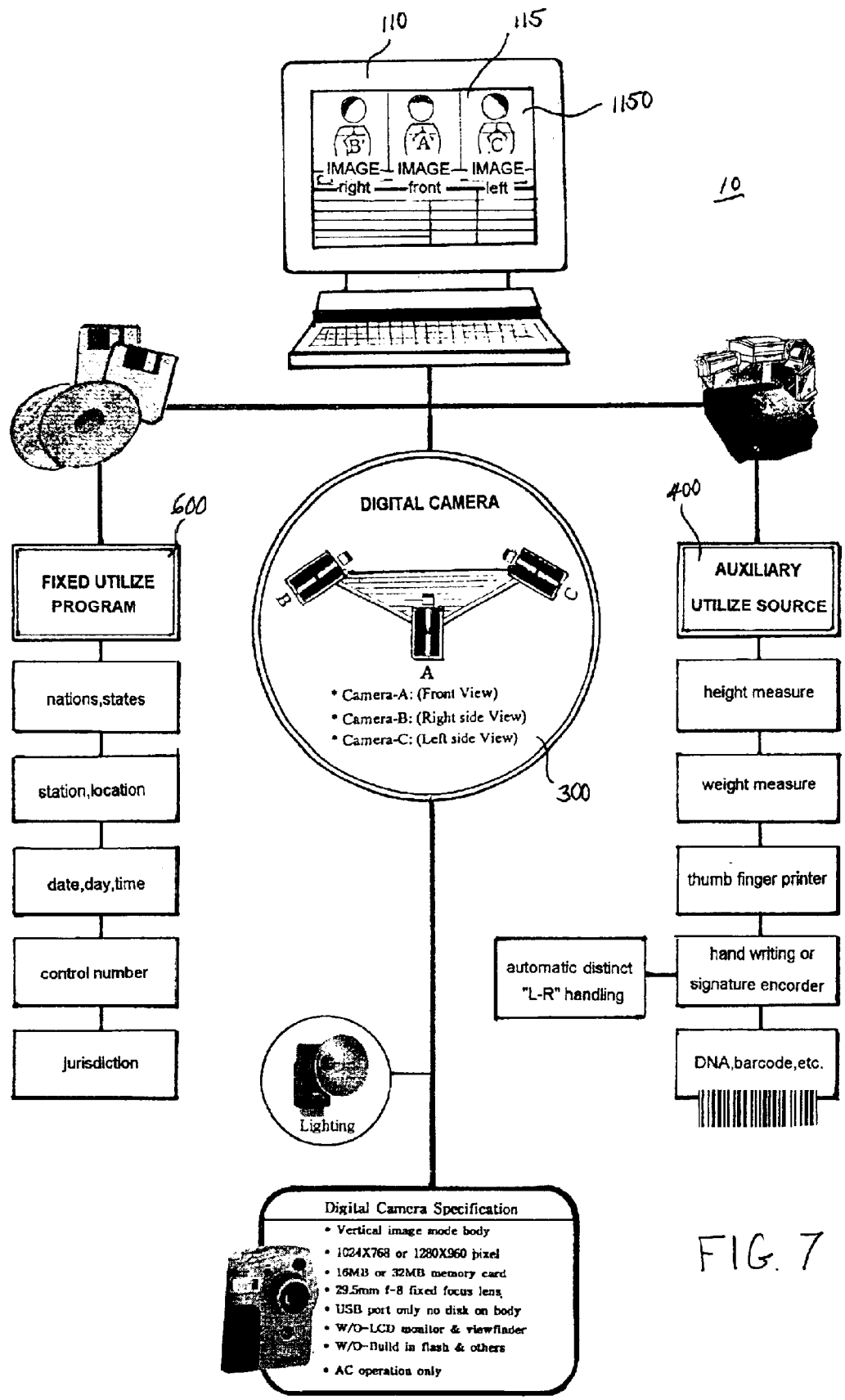
FIG. 7 is an illustrative diagram graphically representing basic types of functional components in an embodiment of the present invention.

Turning next to FIG. 7, there is shown a schematic diagram of functional components in system 10. As shown, each of the functional components including image capture devices 300, auxiliary data capture devices 400, and a program component 600 are functionally coupled to controller 110 of workstation 100. Program component 600 includes a plurality of software modules executable to effect the various device control, system management, and/or user interface operations required for the proper use of system 10. Program component 600 includes suitable software which executes to generate a graphic user interface 1150 displayable for viewing on monitor 115. Program component 600 also includes data and informational overlays which present as part of the graphic user interface 1150 certain logos and other predetermined graphic features, as well as certain predetermined textual information such as the State and Country of the given jurisdiction and the current time/day/date. The data/informational overlays are displayed in graphic user interface 1150 with the image and auxiliary data captured by components 300 and 400 of system 10.

FIG. 7A schematically illustrates another embodiment of the subject system 10 wherein an exemplary arrangement of system components are shown in symbolic detail. Depending on the particular application intended, one or more of the components symbolically depicted may be replaced by other devices of suitable type known in the art, or omitted altogether. Moreover, they may be altered in relative arrangement should the intended application so require. Among the components employed for auxiliary data capture are an automatic height measuring device of a suitable type known in the art coupled to support assembly 4200 for remotely sensing the height of a subject (not shown). Also among the components employed for auxiliary data capture is a handwriting or signature encoder 420 having built-in measures 422 for detecting the left or right-handedness of a subject. These measures 422 may include, for instance, a pair of transducing devices 422a, 422b of optical or other type positioned in spaced manner such that one or the other is covered by the subject's hand, wrist, or forearm during the signature/handwriting encoding, depending on whether the subject is employing his/her right or left hand. The appropriate transducer 422a, 422b then triggers a detection accordingly.

Figure 8A:
FIG. 8A is a graphic representation of exemplary identification data records generated for a graphic user interface in accordance with an exemplary application of one embodiment of the present invention; and, FIG. 8B is a schematic diagram illustrating an exemplary arrangement and construction of a graphic interface showing an exemplary information field employed in accordance with an exemplary application in another embodiment of the present invention.

An illustrative example of a graphic user interface 1150 is shown in FIG. 8A. While the present invention is not limited to the graphic and textual layout shown in FIG. 8A, use of a standardized layout and format would facilitate the sharing of subjects' records amongst different offices, agencies, or jurisdictions. Electronic storage at one site of subjects' identification records in a format such as that shown in FIG. 8A which is recognizable to other remotely disposed facilities greatly simplifies the exchange of records with those facilities.

Towards those ends, the identification data included in the record graphically represented within graphic user interface 1150 contains sufficiently comprehensive information pertaining to subject 20 to satisfy the so-called '6W' approach typically adopted by Law Enforcement Agencies. That is, the record contains information which communicates the WHEN (day, date and time); WHERE (location, district, precinct, . . . ); WHO (physical data, distinguishing traits, name, birthdate, . . . ); WHAT (incident, suspected criminal offense, nature of the incident, . . . ); WHY (reason, cause, motive, . . . ); and, HOW (results, consequences, effects, . . . ). The exemplary record 1150 graphically depicted in FIG. 8A includes a plurality of views 1152a, 1152b, 1152c of the subject captured concurrently from different angular perspectives. Various biologic, biographic, and demographic information is integrated with other readily observable distinguishing trait information within information field 1154. Along with this field 1154 is included a field 1155 containing the suspect's captured thumb/fingerprints and signature or handwriting sample.

Beneath fields 1154 and 1155 is then included one or more fields of information 1156a, 1156b, 1156c. Information field 1156a may, for example, contain various biometric parameter measures and a listing of various characterizing traits. If necessary, that field 1156a may contain detailed graphic representations of certain captured biometric data such as a full set of thumb/fingerprints and extensive signature/handwriting samples stored in separately displayable record portions linked for access via corresponding parameter tags (displayed in the field). In addition to or in place of this informational field 1156a, one or more other informational fields 1156b, 1156c may be employed to provide such information as the country and jurisdictional details pertaining to the given record, or biographic and other personal data/history pertaining to the given subject.

Figure 8B:
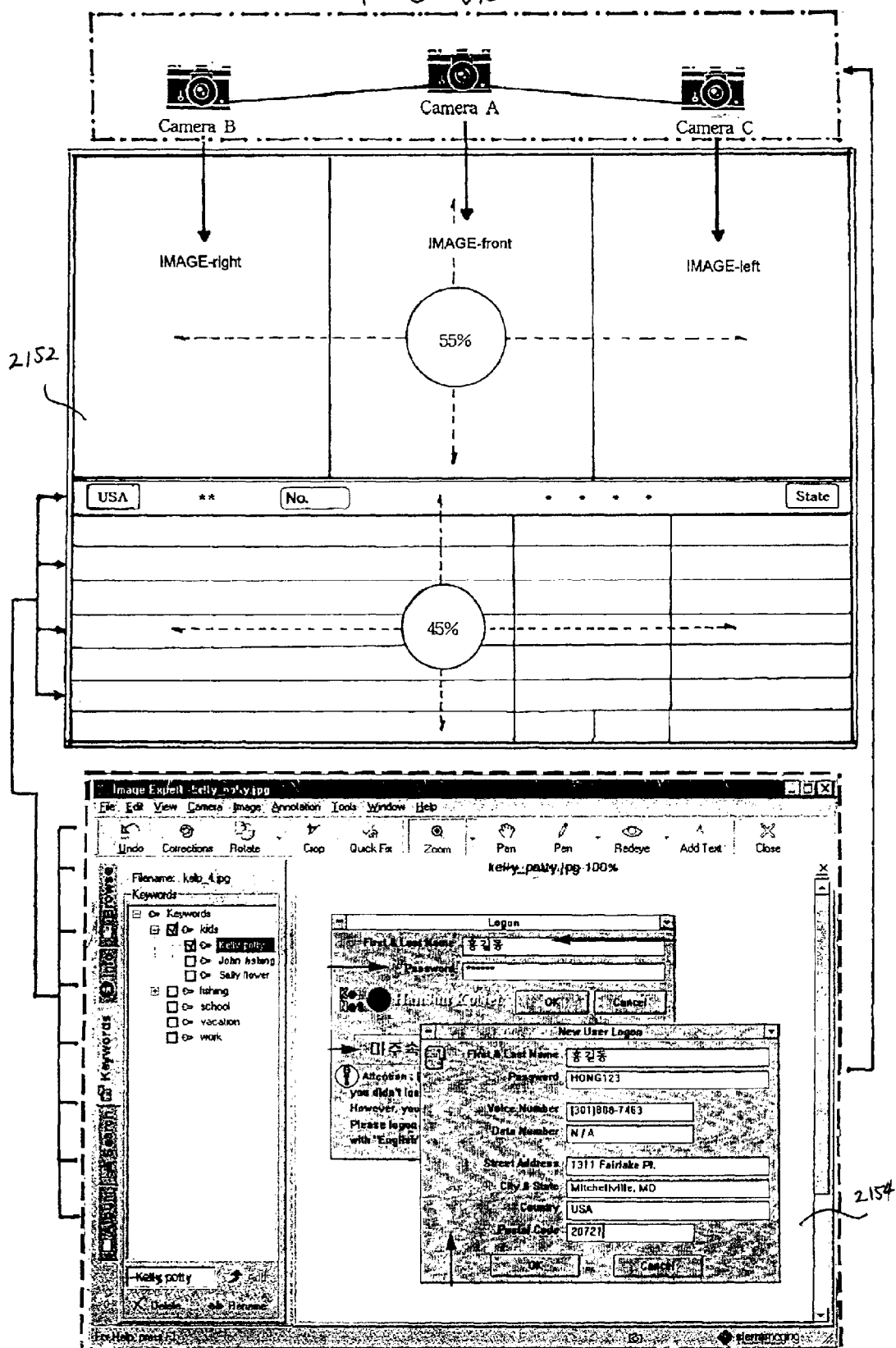

FIG. 8B more schematically illustrates the layout and construction of a graphic user interface such as shown in FIG. 8A. As shown, however, informational field 2154 arranged beneath the field 2152 of imaged views may include computer network-based links and various interface windows automatically generated thereby. This is but another example of a graphic record format that may be employed in accordance with the present invention. The actual choice of format will be determined by the specific requirements of the intended application. Regardless of the format, however, the displayed record may be simply printed in hard copy form at workstation 100 for dissemination when necessary.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular combinations of system components/devices may be used apart from other system components/devices, all without departing from the spirit or scope of the invention as defined in the appended Claims.

What is claimed is:

1. A system for capturing identification data pertaining to a subject comprising:
   (a) a main support assembly spaced a predetermined distance from the subject;
   (b) a plurality of image capture devices displaceably supported by said main support assembly for concurrently generating a plurality of graphic representations of the subject, said image capture devices being adjustably disposed in spaced manner one from the other for respectively rendering said graphic representations from preselected view orientations;
   (c) at least one auxiliary data capture device for capturing a predetermined biometric parameter pertaining to the subject; and,
   (d) a programmably configured workstation operably coupled to said image capture and auxiliary data capture devices for automatically controlling said devices responsive to user actuation thereof, said workstation being operable to formulate for display at least one fixedly combined record containing said plurality of concurrently captured graphic representations arranged adjacent said predetermined biometric parameter captured therewith.

2. The system as recited in claim 1 wherein said main support assembly includes a stand and a plurality of support arms adjustably coupled thereto, said support arms extending laterally from said stand.

3. The system as recited in claim 1 wherein said main support assembly is operably coupled to said workstation for automatic adjustment responsive thereto.

4. The system as recited in claim 1 further comprising a lighting assembly operably coupled to said workstation, said lighting assembly being actuable in synchronized manner with said image capture devices.

5. The system as recited in claim 1 wherein said auxiliary data capture device is selected from the group consisting of: a weight sensor, a height sensor, a fingerprint digitizer, a document scanner, and a handwriting sample capturing electronic writing pad.

6. The system as recited in claim 1 comprising a plurality of said auxiliary data capture devices, said auxiliary data capture devices including a weight sensor, a height sensor, and a fingerprint digitizer.

7. The system as recited in claim 1 comprising at least three said image capture devices each including a photo-capture portion, said image capture devices being disposed in spaced manner one relative to the others to respectively render a front and a pair of opposing side views of the subject.

8. The system as recited in claim 7 wherein each said photo-capture portion includes a digital camera operable to generate said graphic representation of the subject in electronic form.

9. The system as recited in claim 7 wherein said workstation includes a controller and a graphic user interface generated thereby, said graphic user interface being configurable to concurrently display each of said front and side views of the subject and at least one said predetermined biometric parameter captured therewith.

10. The system as recited in claim 1 further comprising a platform supporting said main support assembly, said platform including an elongate extension for positioning said auxiliary data capture device at a fixed distance from said main support assembly.

11. A system for capturing identification data pertaining to a subject comprising:
    (a) an adjustable main support assembly spaced a predetermined distance from die subject, said main support assembly including a stand and a plurality of laterally extending support member adjustably coupled thereto;
    (b) a plurality of image capture devices each coupled to one said support member to be offset in spaced manner one from the other for respectively capturing a front and a pair of opposing side views of the subject, said image capture devices being operable to concurrently generate a plurality of graphic representations of the subject, said image capture devices being adjustably disposed for respectively rendering said graphic representations from preselected view orientations;
    (c) at least one auxiliary data capture device for capturing a predetermined biometric parameter pertaining to the subject;
    (d) a lighting assembly for illuminating the subject actuable in synchronized manner with said image capture devices; and,
    (e) a controller operably coupled to said image capture devices, said auxiliary data capture devices and said lighting assembly for automatically controlling said devices responsive to user actuation thereof, said controller being operable to formulate for display at least one fixedly combined record containing said plurality of concurrently captured graphic presentations arranged adjacent said predetermined biometric parameter captured therewith.

12. The system as recited in claim 11 wherein said auxiliary data capture device is selected from the group consisting of: a weight sensor, a height sensor, a fingerprint digitizer, a document scanner, and a handwriting sample capturing electronic writing pad.

13. The system as recited in claim 11 comprising a plurality of said auxiliary data capture devices, said auxiliary data capture devices including a weight sensor, a height sensor, and a fingerprint digitizer.

14. The system as recited in claim 11 wherein each said image capture device includes a digital camera operable to generate said graphic representation of the subject in electronic form.

15. The system as recited in claim 11 wherein said controller is operable to generate a graphic user interface, said graphic user interface being configurable to concurrently display each of said front and side views of the subject and at least one said predetermined biometric parameter captured therewith.

16. The system as recited in claim 11 further comprising a platform supporting said main support assembly, said platform including an elongate extension for positioning said auxiliary data capture device at a fixed distance from said stand of said main support assembly.

17. A system for concurrently capturing identification data pertaining to a subject comprising:
    (a) an automatically adjustable main support assembly spaced a predetermined distance from the subject, said main support assembly including a stand and a plurality of laterally extending support arms adjustably coupled thereto;

(b) a plurality of digital camera devices each coupled to one said support arm to be offset in spaced manner one from the other for respectively capturing a front and a pair of opposing side mug shot views of the subject, said camera devices being operable to concurrently generate in electronic form a plurality of graphic representations of the subject, said camera devices being adjustably disposed for respectively rendering said graphic representations from preselected view orientations;

(c) a plurality of auxiliary data capture devices for respectively capturing a plurality of predetermined biometric parameters pertaining to the subject; and, (d) a programmably configured workstation operably coupled to said image capture and auxiliary data capture devices for automatically controlling said devices responsive to user actuation thereof, said workstation including a controller and data entry and display devices coupled thereto, said workstation being operable to formulate for display at least one fixedly combined record containing said plurality of concurrently captured graphic representations arranged adjacent said predetermined biometric parameters captured therewith.

18. The system as recited in claim 17 wherein said predetermined biometric parameters include the weight, height, and fingerprint of the subject.

19. The system as recited in claim 17 wherein said predetermined biometric parameters further include the handwriting of the subject.

20. The system as recited in claim 17 wherein said workstation includes a controller and a graphic user interface generated thereby, said graphic user interface being configurable to concurrently display said front and side mug shot views of the subject and at least one said predetermined biometric parameter.

* * * * *